United States Patent
Sotome

(10) Patent No.: US 10,384,616 B2
(45) Date of Patent: Aug. 20, 2019

(54) HOOK APPARATUS

(71) Applicant: PIOLAX, INC., Yokohama-shi (JP)

(72) Inventor: Yukihiro Sotome, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/777,861

(22) PCT Filed: Nov. 7, 2016

(86) PCT No.: PCT/JP2016/082967
§ 371 (c)(1),
(2) Date: May 21, 2018

(87) PCT Pub. No.: WO2017/090415
PCT Pub. Date: Jun. 1, 2017

(65) Prior Publication Data
US 2018/0339661 A1   Nov. 29, 2018

(30) Foreign Application Priority Data
Nov. 26, 2015   (JP) .................................. 2015-231033

(51) Int. Cl.
*B60R 7/08* (2006.01)
*B60P 7/06* (2006.01)
(Continued)

(52) U.S. Cl.
CPC ........ *B60R 7/08* (2013.01); *B60P 7/06* (2013.01); *F16B 45/00* (2013.01); *B60P 7/0807* (2013.01)

(58) Field of Classification Search
CPC .... B60R 7/08; F16B 45/00; B60P 7/06; B60P 7/08; B60P 7/0807
(Continued)

(56) References Cited

U.S. PATENT DOCUMENTS 6,665,911 B1 * 12/2003 Huang ................... B60P 7/0807
24/163 K
6,968,601 B2 * 11/2005 Bivens ....................... B60R 7/10
224/313
(Continued)

FOREIGN PATENT DOCUMENTS

EP        1 623 872 A1     2/2006
EP        1623872 A1 *     2/2006 ............ B60P 7/0807
(Continued)

OTHER PUBLICATIONS

International Search Report (ISR) (PCT Form PCT/ISA/210), in PCT/JP2016/082967, dated Jan. 31, 2017, and English Translation.
(Continued)

*Primary Examiner* — Muhammad Ijaz
(74) *Attorney, Agent, or Firm* — McGinn I.P. Law Group, PLLC

(57) ABSTRACT

There is provided a hook apparatus. A metal bracket is fixed to a vehicle body with a resin case mounted thereon. A shaft is supported by the bracket. A hook including a pair of opposed surfaces and a pair of shaft hole parts formed in the opposed surfaces and is capable of inserting the shaft therethrough. The hook is supported rotatably on the bracket through the shaft. The case includes an elastic piece extending along the rotation shaft direction and capable of coming into elastic contact with the hook. The elastic piece includes radial-direction contact parts capable of coming into contact with sliding contact surfaces respectively formed in the hook around the shaft hole parts in a radially inward direction from outside in a radial direction; and axial-direction contact parts coming into contact with the opposed surfaces of the hook formed around the shaft hole parts.

20 Claims, 11 Drawing Sheets

(51) Int. Cl.
*F16B 45/00* (2006.01)
*B60P 7/08* (2006.01)

(58) Field of Classification Search
USPC ......... 248/222.52, 294.1, 304, 99, 100, 234,
248/322, 339; 297/188.01, 188.08
See application file for complete search history.

(56) References Cited

U.S. PATENT DOCUMENTS

| | | | |
|---|---|---|---|
| 2012/0043363 A1* | 2/2012 | Lee | B60R 7/10 |
| | | | 224/313 |
| 2017/0001571 A1* | 1/2017 | Cho | B60R 7/08 |
| 2017/0265666 A1* | 9/2017 | Sotome | B60R 7/10 |
| 2018/0339661 A1* | 11/2018 | Sotome | B60P 7/06 |

FOREIGN PATENT DOCUMENTS

| | | |
|---|---|---|
| JP | 2004-042818 A | 2/2004 |
| JP | 2006-046548 A | 2/2006 |
| JP | 2013-064500 A | 4/2013 |

OTHER PUBLICATIONS

International Search Report (ISR) (PCT Form PCT/ISA/237), in PCT/JP2016/082967, dated Jan. 31, 2017.

* cited by examiner

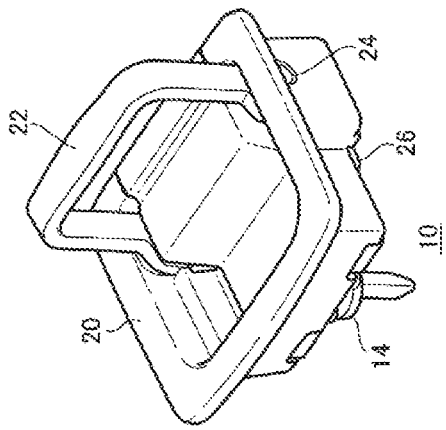
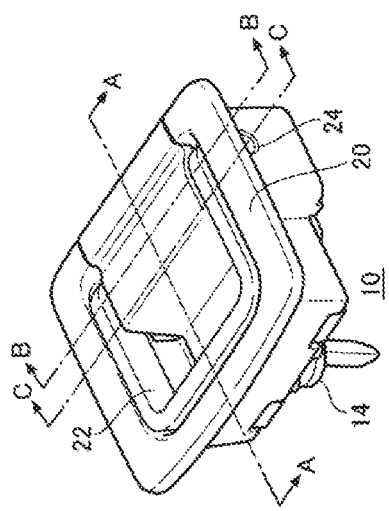

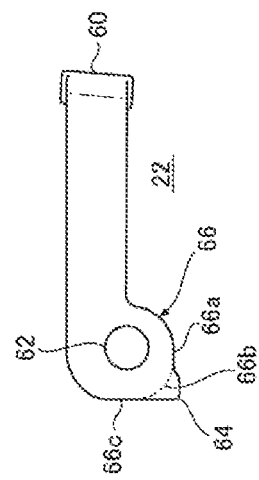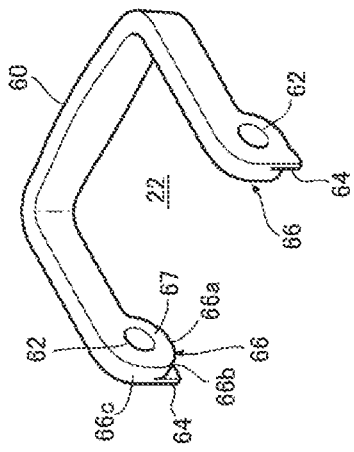

HOOK APPARATUS

TECHNICAL FIELD

This invention relates to a hook apparatus for vehicles.

BACKGROUND ART

A hook apparatus is arranged in a room of a vehicle and is used to hang a rope or the like. Since a hook of the hook apparatus is troublesome if it protrudes when not in use, it is configured such that it can be stored (see the patent document 1 and the like).

A hook apparatus disclosed in the patent document 1 includes a substantially U-shaped hook body having two bearing parts in the two ends thereof, a shaft capable of being inserted into the bearing parts of the hook body so as to support the hook body rotatably, a metal bracket for supporting the shaft, a base frame placed on the metal bracket and capable of storing the hook body when not in use, and a plate spring fixed to the base frame for energizing the hook body. The hook body includes cam surfaces on the outer surfaces of the bearing parts, and the plate spring is capable of coming into elastic contact with the cam surfaces of the hook body to hold the hook body in a stored state and in a draw-out position.

PRIOR ART DOCUMENT

Patent Document

Patent Document 1: Japanese Patent Application Publication No. 2006-046548A

SUMMARY OF INVENTION

Problems to be Solved by Invention

In the hook apparatus according to the patent document 1, the plate spring made of metal material holds the posture of the hook body and the plate spring is formed separately from the base frame to increase the number of parts, resulting in a high cost. On the other hand, when an energizing device for holding the posture of the hook body is molded integrally with the base frame, there is a possibility that the energizing device can be weakened.

This invention is made in view of the above problem and thus its object is to provide a hook apparatus in which a device for holding the posture of a hook is manufactured inexpensively and the durability of the holding device is prevented against deterioration.

Means for Solving Problems

In solving the above problem, an embodiment of the invention provides a hook apparatus which comprises: a case made of resin material; a bracket made of metal material and fixed to the side of a vehicle body with the case mounted thereon; a shaft supported by the bracket; and, a hook including a pair of opposed surfaces facing each other and a pair of shaft hole parts formed in the pair of opposed surfaces and capable of inserting the shaft therethrough, while the hook is supported rotatably on the bracket through the shaft. The case includes an elastic piece extending along the rotation shaft direction of the hook and capable of coming into elastic contact with the hook. The elastic piece includes radial-direction contact parts capable of coming into contact with sliding contact surfaces formed in the hook around the shaft hole parts in a radially inward direction from outside in a radial direction, and axial-direction contact parts capable of coming into contact with the opposed surfaces of the hook formed around the shaft hole parts in an axially outward direction.

Another embodiment of the invention also provides a hook apparatus which comprises: a case made of resin material; a bracket made of metal material and fixed to the vehicle body side with the case mounted thereon; a shaft supported by the bracket; and a hook including a pair of opposed surfaces facing each other and a pair of shaft hole parts formed in the pair of opposed surfaces and capable of inserting the shaft therethrough, while the hook is supported rotatably on the bracket through the shaft. The case includes an elastic piece extending from a bottom part of the case along the rotation shaft direction of the hook and capable of coming into elastic contact with the hook. The elastic piece includes radial-direction contact parts capable of coming into contact with sliding contact surfaces formed in the hook around the shaft hole parts in a radially inward direction from outside in a radial direction, and a projection provided in such portion of the elastic piece as exists on the tip side thereof with respect to the base end thereof and projected so as to come into contact with or come close to the bracket.

Advantageous Effects of Invention

This invention can provide a hook apparatus configured such that a device for holding the posture of a hook is manufactured inexpensively and the durability of the holding device is prevented against deterioration.

BRIEF DESCRIPTION OF DRAWINGS

FIGS. 1A and 1B are perspective views of a hook apparatus according to an embodiment of the invention.

FIGS. 4A and 4B are explanatory views of a hook.

EMBODIMENTS OF INVENTION

Figure 2:
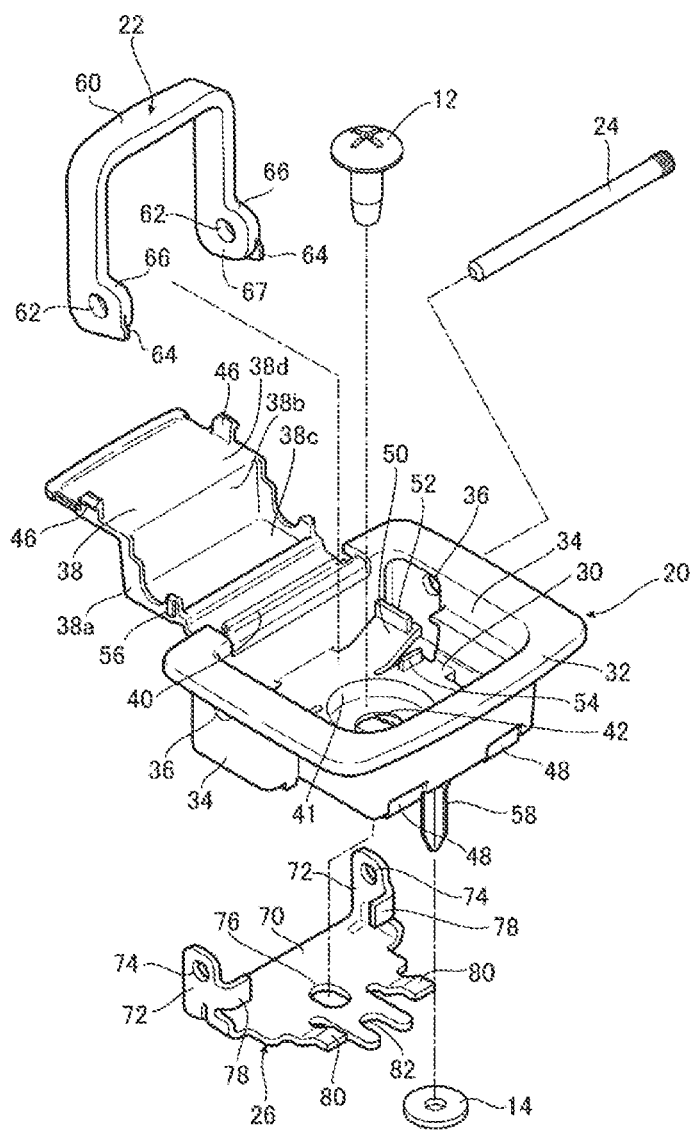
FIG. 2 is an exploded view of the hook apparatus of the embodiment.

In the hook apparatus of this embodiment, the posture of the hook is held by supporting it using an elastic piece formed in the case. The formation of the elastic piece in the case enables the hook apparatus to be manufactured more inexpensively than in a case where the posture of a hook is held using a separately provided elastic piece. Also, since the elastic piece of the case can be brought into contact with the hook from two different directions to support the hook, the case can be prevented from being deformed by a load given from the hook.

FIGS. 1A and 1B are perspective views of a hook apparatus 10 according to this embodiment. FIG. 1A is a perspective view of the hook apparatus 10, showing a state where a hook 22 is closed; and, FIG. 1B is a perspective view of the hook apparatus 10, showing a state where a hook 22 is opened. The hook apparatus 10 includes a substantially U-shaped hook 22, a case 20 capable of storing the hook 22 therein, a shaft 24 for supporting the hook 22 rotatably, and a bracket 26 for fixing the hook apparatus 10 to the side of a vehicle body.

The hook apparatus 10 is mounted in such a manner that the case 20 is embedded in the floor of a baggage room of a vehicle such as a ban and a wagon. When using the hook apparatus 10 actually, the hook 22, from a state shown in FIG. 1A where it is stored in the case 20, is rotated in the opening direction into a state shown in FIG. 1B where the hook 22 protrudes from the case 20, and then a rope or the like is hung on the hook 22.

A state shown in FIG. 1A where the hook 22 is stored in the case 20 is called a stored state or a closed state, and a state shown in FIG. 1B where the hook 22 protrudes from the case 20 is called an opened state of the hook 22. Also, the rotation of the hook 22 from the state shown in FIG. 1A where the hook 22 is stored in the case 20 to the state in FIG. 1B where the hook 22 protrudes from the case 20 is called the rotation of the hook 22 in the opening direction, whereas the reverse rotation from the state in FIG. 1B where the hook 22 protrudes from the case 20 to the state shown in FIG. 1A where the hook 22 is stored in the case 20 is called the rotation of the hook 22 in the closing direction. Also, in the stored state shown in FIG. 1A, the bottom side of the case 20 is defined as a lower side, whereas the reverse or exposed side is defined as an upper side. Further, in the hook apparatus 10, the shaft side of the hook 22 is defined as a front side, whereas the reverse side where the connected part of the hook 22 enters and retracts is defined as a back side.

FIG. 2 is an exploded view of the hook apparatus 10 of the embodiment. Description is given of a process for assembling the hook apparatus 10. The case 20 is placed on the bracket 26, a shaft hole part 62 of the hook 22 is coaxially aligned with a shaft hole part 74 of the bracket 26 and a shaft hole part 36 of the case 20, and the shaft 24 is inserted into the shaft hole part 62, bearing part 74 and shaft hole part 36. The shaft 24 may have a knurled groove formed in one end thereof for preventing the shaft 24 from slipping off these parts and it may be pressed into them to prevent it from slipping off them. Thus, by insertion of the shaft 24, the case 20, hook 22 and bracket 26 are assembled integrally.

When mounting the hook apparatus 10 onto a vehicle body, the hook apparatus 10 is fastened and fixed by a bolt 12 to a mounting recess formed in a panel provided on the side of the vehicle body. After the bolt 12 is fastened, the shaft 24 and bolt 12 are covered with a cover part 38 of the case 20, thereby completing the mounting of the hook apparatus 10 onto the vehicle body. Description is given of the respective parts of the hook apparatus 10 with reference to new drawings.

Figure 3A:
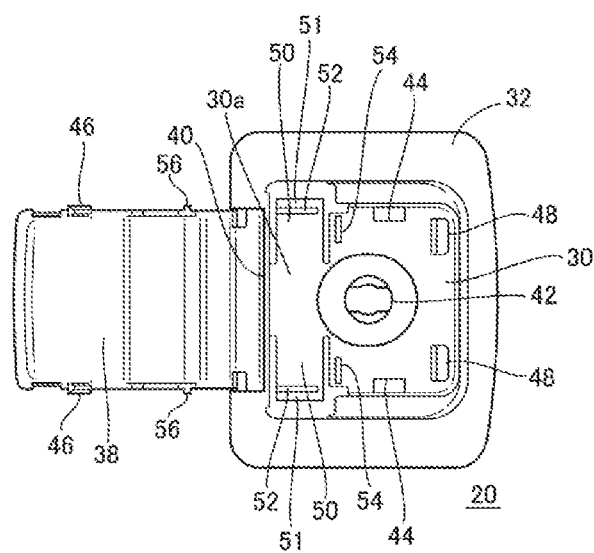
FIGS. 3A and 3B are explanatory views of a case.
Figure 3B:
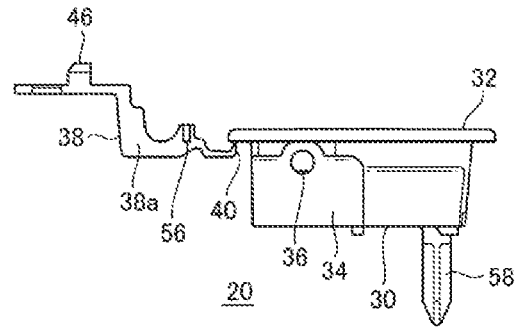

FIGS. 3A and 3B explain the case 20. FIG. 3A is a top view of the case 20, and FIG. 3B is a side view of the case 20. The case 20 is formed of resin material and includes a bottom part 30, a flange part 32, a side wall part 34, a shaft hole part 36, a cover part 38, a hinge part 40, a bolt hole 42, a locking hole 44, a locking pawl 46, an engaging part 48, an elastic piece 50, a radial-direction contact part 51, an axial-direction contact part 52, a second limit section 54 and a first limit section 56.

The case 20 is formed in a rectangular box shape, while the side wall part 34 stands up around the bottom part 30 and the flange part 32 protrudes from the upper end of the side wall part 34. In the bottom part 30, there is formed a bolt hole 42 capable of inserting therethrough a bolt which is used to fix the case 20 to the vehicle body. A cylindrical recess 41 is formed around the bolt hole 42 in the bottom part 30, so that the head of the bolt 12 can be stored in the recess 41. As shown in FIGS. 2 and 3B, the shaft hole parts 36 are formed respectively in the side wall parts 34 on the two sides of the case 20 in the width direction.

The cover part 38 is formed in a plate shape and is connected to the side wall parts 34 by the hinge part 40 formed on the front side. The hinge part 40 is formed thin and connects the cover part 38 rotatably to the side wall part 34 on the front side.

The cover part 38 is left opened until the hook apparatus 10 is mounted onto the vehicle body by the bolt 12 and, after mounted onto the vehicle body, as shown in FIG. 1B, the cover part 38 is closed. In the mounting completed state, the cover part 38 faces the bottom part 30. The cover part 38 includes a pair of locking pawls 46 on both sides thereof. The paired locking pawls 46, when the cover part 38 is closed, are locked into a pair of locking holes 44 formed in the bottom part 30 to stop the rotation of the cover part 38 in the opening direction, thereby bringing the cover part 38 into a closed state.

The cover part 38 includes first limit sections 56 respectively formed in wall-like side portions 38a situated on the two sides thereof in the width direction. The first limit section 56 protrudes outward in the axial direction from the wall-like side portions 38a. The first limit sections 56 come into contact with or come close to the hook 22 to limit the axially inward movement of the hook 22. The cover part 38 has a step portion 38b between a shaft cover portion 38c for storing the shaft 24 therein and a bolt cover portion 38d for covering the bolt 12, while the bolt cover portion 38d is recessed more than the shaft cover portion 38c. This configuration can form a space capable of inserting therein a finger of a user for gripping the hook 22.

The second limit sections 54 are formed so as to protrude upward from the bottom part 30 and extend in the axial direction. The second limit sections 54 come into contact with or come close to the closed cover part 38 to limit the movement of the cover part 38. Specifically, the second limit sections 54 come into contact with or come close to the closed cover part 38 on the front side of the step portion 38b of the cover part 38 to limit such movement of the cover part 38 as goes toward the front side. The second limit sections 54 are situated axially inward of the side portion 38a of the cover part 38, and come into contact with or come close to the cover part 38 to limit the axially inward movement of the side portion 38a. The second limit sections 54 can restrain the side portions 38a in which the first limit sections 56 are formed from being flexed in an axially inward direction by a load given from the hook 22.

The elastic piece 50 is formed as a pair of elastic pieces which respectively extend left and right in the rotation shaft direction of the hook 22 from a support portion 30a formed in the center of the bottom part 30. The support portion 30a of the bottom part 30 is situated in a position where the bottom part 30 overlaps with the elastic piece 50 in the rotation shaft direction. The elastic piece 50 is a flat plate-shaped cantilevered piece to be supported by the support portion 30a and is flexible in the vertical direction. The elastic piece 50 makes elastic contact with the hook 22 to apply an energizing force for holding the posture of the hook 22, thereby giving the hook 22 a sense of moderation. Since the elastic piece 50 is formed integrally with the case 20, when compared with a case where the elastic piece 50 is formed separately from the case 20, the number of parts can be reduced, thereby enabling facilitation of the assembling operation and reduction of the manufacturing cost. Also, when compared with a case where the elastic piece 50 is made of metal material different from that of the case 20, the frictional resistance between the elastic piece 50 and hook 22 is easy to increase.

The elastic piece 50 includes the radial-direction contact part 51 capable of coming into contact with a sliding contact part 66 of the hook 22 formed around the shaft hole part 62 in a radially inward direction from outside in a radial direction, and the axial-direction contact part 52 capable of coming into contact with the opposed surface of the hook 22 formed around the shaft hole part in an axially outward direction. The sliding contact part 66 of the hook 22 is formed around the shaft hole part 62 in a shape like a substantially cylindrical outside surface. The radial-direction contact part 51 extends along the extending direction of the elastic piece 50 on the tip end side of the elastic piece 50. The axial-direction contact part 52 is formed so as to protrude from the upper surface of the elastic piece 50, while the protruding direction of the axial-direction contact part 52 is orthogonal to the radial-direction contact part 51.

The engaging part 48 is composed of a pair of engaging parts 48 each formed in a hole-like shape on the back side of the bottom part 30. The engaging parts 48 are engaged with the bracket 26 to provisionally hold the case 20 and bracket 26 integrally. A pin 58 protrudes downward from the lower surface of the bottom part 30 and, in the apparatus mounting operation, is inserted into a hole formed in a panel provided on the vehicle body side, thereby positioning the hook apparatus 10. A washer 14 is inserted into the pin 58 to buffer the hook apparatus 10 and the vehicle body side panel.

FIGS. 4A and 4B explain the hook 22. FIG. 4A is a perspective view of the hook 22, and FIG. 4B is a side view of the hook 22. The hook 22 includes a hook part 60, a pair of shaft hole parts 62, a pair of protrusion part 64 and a pair of sliding contact parts 66, while the hook 22 is pivotally supported on the shaft 24. The hook 22 is made of metal material. To form the hook 22, a metal plate is punched out to form a plate-like primary formed member and the primary formed member is then bending-press worked in the plate thickness direction into a substantially U-like shape. Since the hook 22 is formed by such metal plate working, the strength thereof can be enhanced when compared with a hook made of resin and the working cost thereof can be reduced greatly when compared with a case where a hook is made with die-casting.

The hook part 60 is formed in a substantially U-like shape and is capable of hooking a rope or the like thereon. The paired shaft hole parts 62 are formed respectively in a pair of opposed surfaces 67 which are respectively formed on the two end sides of the hook part 60 so as to face each other in the axial direction, while the shaft 24 can be inserted through the shaft hole parts 62. Since the penetrating hole of each shaft hole part 62 is worked by punching out a metal plate, it can be worked easily and it can have higher strength than a bearing such as a hinge which is formed by bending.

The protrusion part 64 is formed to protrude from the shaft hole part 62 outward in a radially direction and, when the hook 22 is opened in the opening direction, is brought into contact with the bracket 26 to stop the rotation of the hook 22.

The sliding contact part 66 is formed in a substantially disk-like shape around the shaft hole part 62, while the curved outer peripheral surface of the sliding contact part 66 is brought into contact with the elastic piece 50. The protrusion part 64 protrudes in the radial direction from the sliding contact part 66 but does not come into contact with the elastic piece 50.

The sliding contact part 66, when the hook 22 is rotated, is brought into contact with the radial-direction contact part 51 of the elastic piece 50. The sliding contact part 66 includes a first outer peripheral surface 66a which comes into contact with the elastic piece 50 in the closed state of the hook 22, a second outer peripheral surface 66b which comes into contact with the elastic piece 50 in an intermediate position between the closed and opened states of the hook 22, and a third outer peripheral surface 66c which comes into contact with the elastic piece 50 in the opened state of the hook 22.

The second outer peripheral surface 66b has a larger radial-direction distance from the center of the shaft hole part 62 than the first and third outer peripheral surfaces 66a and 66c, and receives a greater energizing force from the elastic piece 50 than the first and third outer peripheral surfaces 66a and 66c. When the contact position of the hook 22 with the elastic piece 50 exceeds the position of the second outer peripheral surface 66b, the hook 22 is energized so as to rotate to the opened or closed state.

Returning to FIG. 2, the bracket 26 is made of metal material and includes a plate part 70, a pair of side parts 72, a pair of bearing parts 74, a bolt hole 76, a pair of stopper parts 78, an engagement part 80, and a slit 82. Since the hook 22, shaft 24 and bracket 26 are made of metal material, the load bearing capacity of the hook apparatus 10 can be enhanced.

The plate part 70 is formed in a flat plate-like shape and the bottom part 30 of the case 20 is placed on the plate part 70. The plate part 70 includes in the center thereof a bolt hole 76 through which the bolt 12 can be inserted. The paired side parts 72 are respectively stand up from both sides of the plate part 70 and face each other in the axial direction. The paired bearing parts 74 are respectively formed in the paired side parts 72 and support the shaft 24.

The paired stopper parts 78 respectively protrude inward in an axially inward direction from the side parts 72 and are situated apart from the plate part 70. The paired stopper parts 78 come into contact with the protrusion parts 64 of the hook 22 to stop the rotation of the hook 22 in the opening direction. Since a load in the opening direction of the hook 22 is received by the bracket 26 made of metal material, the load bearing capacity of the hook apparatus 10 can enhanced.

The paired engagement parts 80 are curved in a manner to stand up from the plate part 70 and extend toward the back side of the hook apparatus 10. The engagement parts 80 are inserted into and engaged with the hole-like engaging parts 48 of the case 20 to prevent the back side of the bracket 26 from moving apart from the lower surface of the case 20. The pin 58 is inserted into the slit 82.

Figure 5:
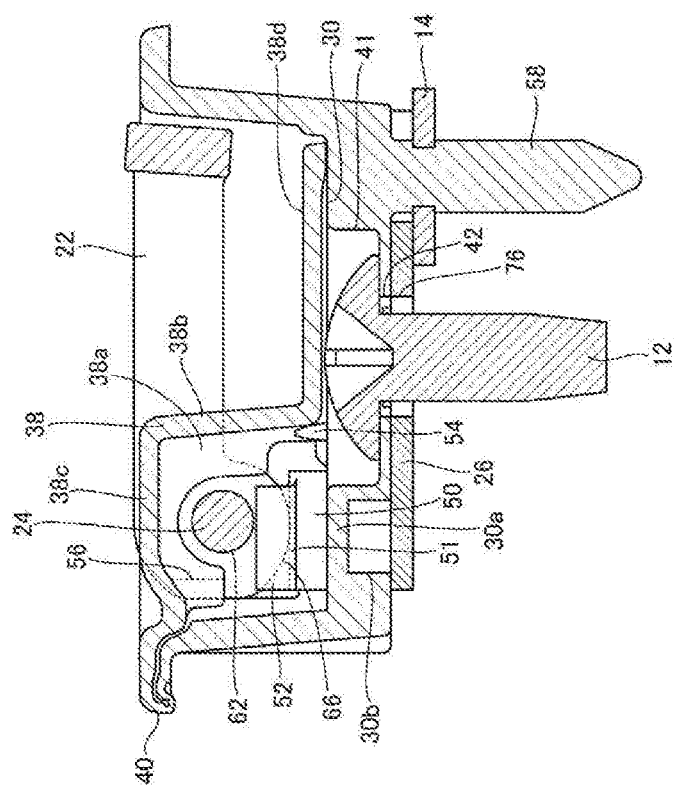
FIG. 5 is a section view of the hook apparatus, taken along the line A-A shown in FIG. 1A.

FIG. 5 is a section view of the hook apparatus 10 taken along the line A-A shown in FIG. 1A. Since the bolt cover portion 38d of the cover part 38 is recessed from the shaft cover portion 38c, a user can insert his or her finger into the thus-recessed portion to grip the hook 22.

The second limit section 54 protrudes upward on the front side of the step portion 38b of the cover part 38 and comes into contact with or comes close to the step portion 38b. The cover part 38, when the hook 22 is in use, is given a load going toward the front side from the hook 22, and the step portion 38b of the cover part 38 is brought into contact with the second limit section 54, thereby limiting the movement of the cover part 38. This can suppress the deformation of the cover part 38 and thus can enhance the load bearing capacity of the hook apparatus 10.

The elastic piece 50 is formed to stand up from the support portion 30a of the bottom part 30, while the radial-direction contact part 51 located on the tip end side of the elastic piece 50 is brought into contact with the sliding contact part 66 of the hook 22, thereby energizing the sliding contact part 66 upward. This configuration can suppress the shaking motion of the hook 22. The elastic piece 50 moves away from the bracket 26, whereas a lower section 30b of the support portion 30a comes into contact with or comes close to the bracket 26. Thus, the support portion 30a is prevented from deforming downward, whereby the energizing force of the elastic piece 50 can be stabilized.

Figure 6A:
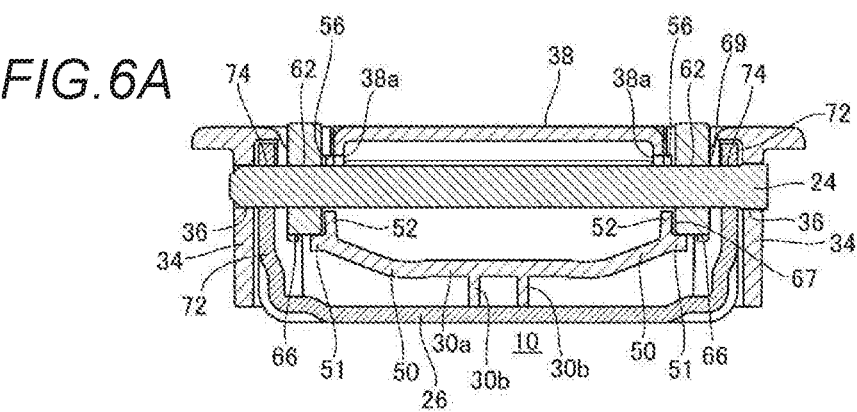
FIG. 6A is a section view of the hook apparatus, taken along the line B-B shown in FIG. 1A.
Figure 6B:
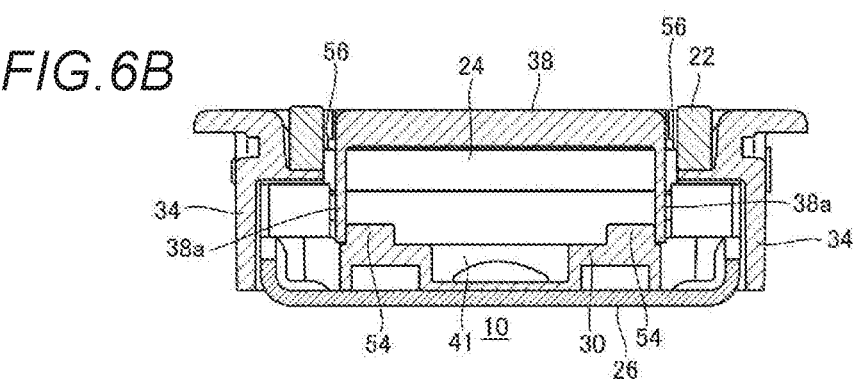
FIG. 6B is a section view of the hook apparatus, taken along the line C-C shown in FIG. 1A.

FIG. 6A is a section view of the hook apparatus 10 taken along the line B-B shown in FIG. 1A, and FIG. 6B is a section view of the hook apparatus 10 taken along the line C-C shown in FIG. 1A.

As shown in FIG. 6A, the radial-direction contact part 51 of the elastic piece 50 comes into contact with the sliding contact part 66 in a radially inward direction to energize it. Also, the axial-direction contact parts 52 of the elastic piece 50 respectively come in an axially outward direction near to the opposed surfaces 67 formed around the shaft hole parts 62 of the hook 22.

Since the lower section 30b of the support portion 30a is in contact with the bracket 26, when the paired elastic pieces 50 are given downward-going loads from the hook 22, the support portion 30a is prevented from moving downward, thereby stabilizing the energizing forces of the paired elastic pieces 50 against the hook 22.

Here, when a large tensile load is applied to the hook 22 from a rope hanging on the hook 22, the U-shaped hook 22 is going to deform in a direction where the two ends thereof approach each other. Thus, the axial-direction contact parts 52 come in an axially outward direction near to the opposed surfaces 67 formed around the shaft hole parts 62, whereby the movement of the hook 22 in the axial direction can be limited.

Also, the first limit sections 56 comes in the axial direction near to the opposed surfaces 67 formed around the shaft hole parts 62. A clearance between the first limit section 56 and the opposed surface 67 of the hook 22 is set smaller than a clearance between the outside surface 69 of the hook 22 and the side part 72 of the bracket 26, whereby the movement of the hook 22 in the axial direction can be limited.

As shown in FIG. 6B, the second limit parts 54 come into contact with or come close to the inner surfaces of the side portions 38a of the cover part 38 in the axial direction to limit the axially inward movement of the side portions 38a. Thus, when the first limit sections 56 formed in the side portions 38a are given a load going in an axially inward direction from the hook 22, the side portions 38a can be prevented from deforming in an axially inward direction.

Figure 7A:
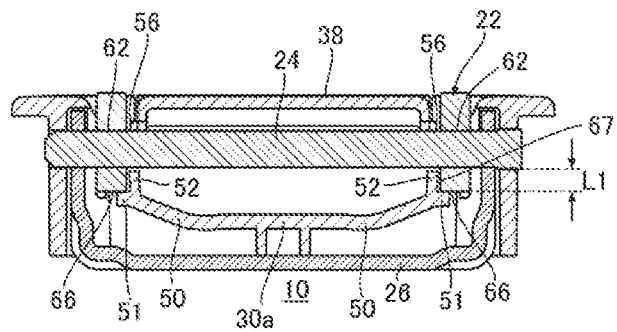
FIGS. 7A to 7C are views to explain the operation of an elastic piece.
Figure 7B:
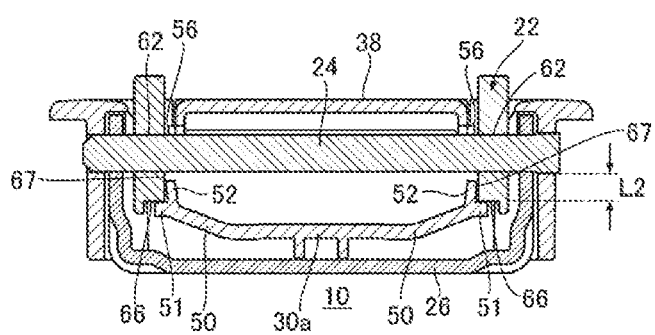
Figure 7C:
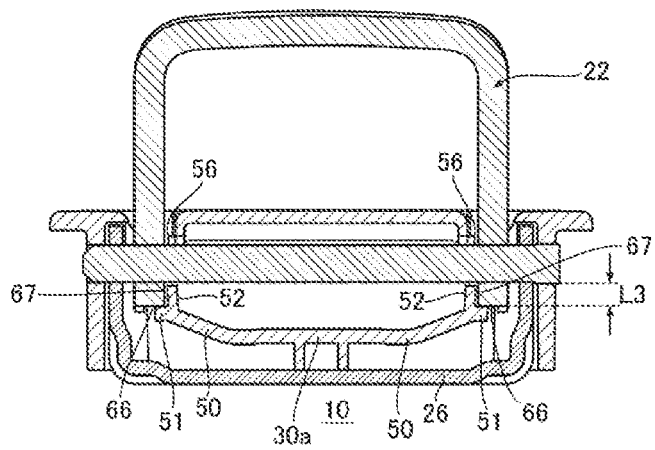

FIGS. 7A to 7C explain the operation of the elastic piece 50. FIG. 7A is a section view of the hook apparatus 10 in the closed state, FIG. 7B is a section view of the hook apparatus 10 in an intermediate position between the closed and opened states, and FIG. 7C is a section view of the hook apparatus 10 in the opened state. The hook 22 shown in FIG. 7B is in a state where it is inclined about 45 degrees with respect to the bottom part 30 and the second outer peripheral surface 66b shown in FIG. 4B is in contact with the elastic piece 50.

A radial-direction clearance L2 shown in FIG. 7B between the radial-direction contact part 51 of the elastic piece 50 and the sliding contact part 66 of the hook 22 is larger than a radial-direction clearance L1 shown in FIG. 7A between the radial-direction contact part 51 and sliding contact part 66, and is also larger than a radial-direction clearance L3 shown in FIG. 7C between the radial-direction contact part 51 and sliding contact part 66. Thus, when the elastic piece 50 is pressed more downward than in the opened state and closed state, the hook 22 is given a large energizing force, and when the hook 22 is rotated slightly, the hook 22 is given such an energizing force from the elastic piece 50 as rotates the hook 22 into the opened or closed state, thereby enabling the hook 22 to enhance the sense of moderation.

When the elastic piece 50 is made of resin material, there is a fear of deforming with passage of time. In view of this, as shown in FIG. 7B, the hook apparatus 10 is configured such that, when the paired elastic pieces 50 deform downward, the paired axial-direction contact parts 52 move axially outward so as to spread and thus come into contact with the opposed surface 67 of the hook 22. Thanks to this configuration, even when the elastic pieces 50 deform downward due to deterioration with passage of time, the axial-direction contact parts 52 enable the elastic pieces 50 to maintain their contact with the hook 22, so that the elastic pieces 50 can apply a frictional force to the hook 22.

Also, when a great tensile load is applied to the hook 22, the substantially U-shaped hook 22 is going to deform in a direction to make its two ends come close to each other, so that a large axially inward load is input into the paired axial-direction contact parts 52, thereby raising a possibility of accelerating wear of the elastic pieces 50. On the other hand, when the axially inward movements of the two ends of the hook 22 are suppressed by the first limit sections 56 of the cover part 38 and further the deformation of the first limit sections 56 of the cover part 38 is suppressed by the second limit sections 54 of the bottom part 30 shown in FIG. 6B, the load bearing capacity and durability of the hook apparatus 10 can be enhanced.

Figure 8A:
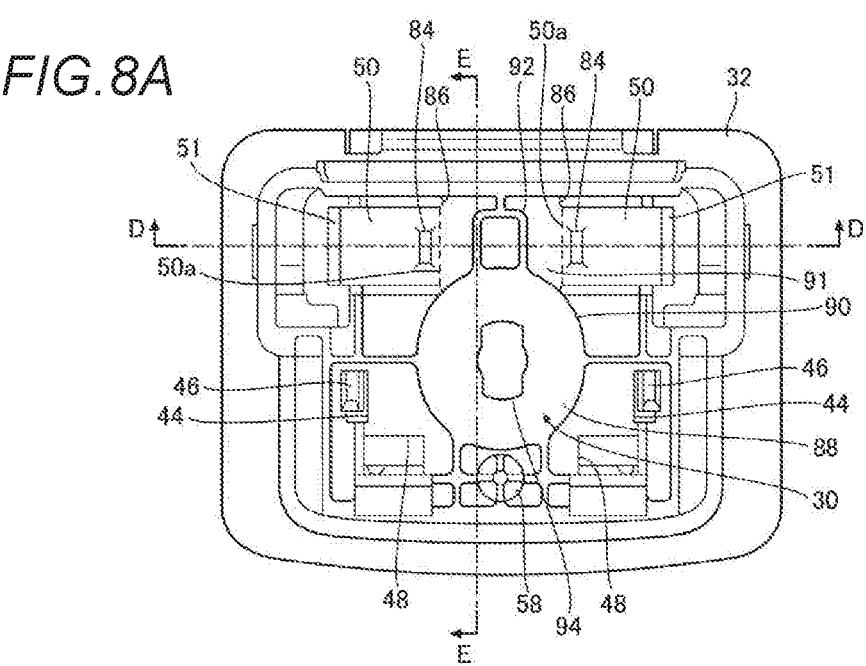
FIGS. 8A and 8B are explanatory views of a case according to a modification.
Figure 8B:
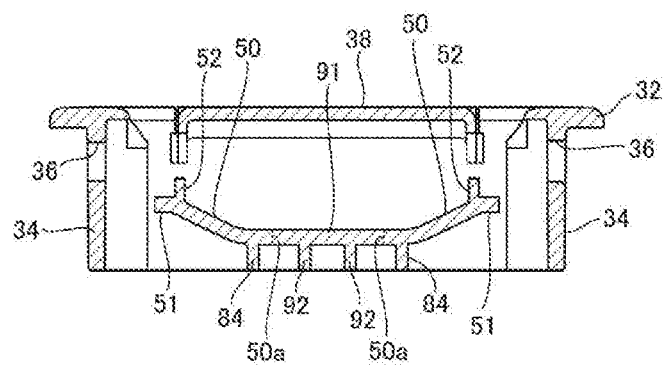
Figure 9:
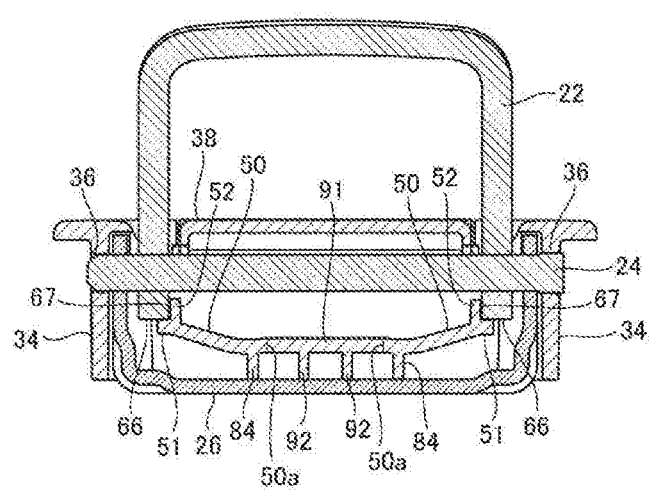
FIG. 9 is a section view of a hook apparatus including the case of the modification, showing a section taken in the same position as in FIG. 8B.
Figure 10:
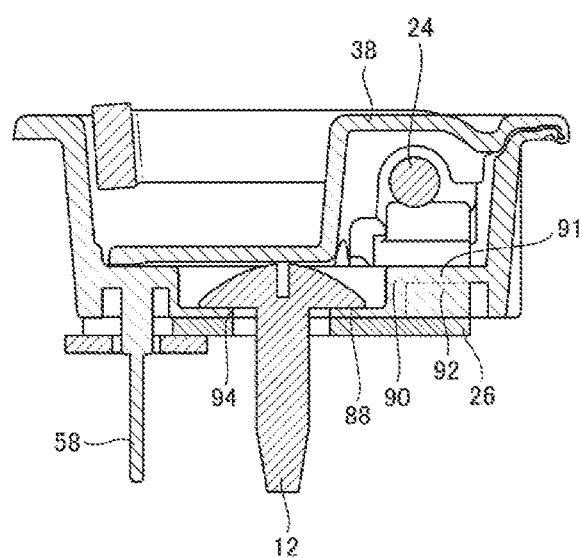
FIG. 10 is a section view of the hook apparatus including the case of the modification, showing a section taken in the same position as the line E-E shown in FIG. 8A.

FIGS. 8A and 8B explain a case 120 according to a modification. FIG. 8A is a bottom view of the case 120, and FIG. 8B is a section view of the case 120 taken along the line D-D shown in FIG. 8A. Here, the case 120 shown in FIGS. 8A and 8B shows a state where a cover part 38 is closed. Also, FIG. 9 is a section view of a hook apparatus 100 including the case 120 of the modification, showing the section in the same position as in FIG. 8B. FIG. 10 is a section view of a hook apparatus 100 including the case 120 of the modification, showing a section in the same position as the position of the section of the case 120 taken along the line E-E shown in FIG. 8A. The case 120 shown in FIG. 8B, similarly to the case 20 shown in FIG. 6A, is mounted on the bracket 26 and, by insertion of the shaft 24, is assembled integrally with the hook 22 and bracket 26.

The case 120 shown in FIG. 8B is different from the case 20 shown in FIG. 6A in that the elastic piece 50 includes a projection 84. The projection 84 is situated in an intermediate portion of a lower surface of the elastic piece 50 and projects downward and, as shown in FIG. 9, it comes into contact with or comes close to the bracket 26. Such formation of the projection 84 reduces stress concentration which, when the elastic piece 50 flexes, occurs around a slit end 86.

The bottom part 30 of the case 120 includes a seat surface 88, a circumferential wall portion 90, an extension portion 91 and a protruding wall portion 92. A bolt hole 94 capable of inserting a bolt therethrough is formed in the center of the seat surface 88. As shown in FIG. 10, the seat surface 88 is fastened through the bracket 26 to the vehicle body side by a bolt 12, whereby the hook apparatus 100 is fixed to the vehicle body side.

The circumferential wall portion 90 stands up around the seat surface 88 and has a cylindrical shape. When the seat surface 88 is recessed by the circumferential wall portion 90, as shown in FIG. 10, the screw head of the bolt 12 can be stored. The extension portion 91 extends from the upper end of the circumferential wall portion 90 and has a flat plate-like shape. The elastic piece 50 extends in the axial direction of the shaft 24 from the extension portion 91 and is formed in a flat shape on the same surface as the extension portion 91. The extension portion 91 functions as a support portion for supporting the elastic piece 50. As shown in FIG. 9, the elastic piece 50 is formed such that it extends from the extension portion 91 in parallel to the shaft 24 and curves upward on the tip end side from the projection 84.

The protruding wall portion 92 projects downward from the extension portion 91 and protrudes laterally from the circumferential wall portion 90. The protruding wall portion 92 comes into contact with the bracket 26 in a position where the elastic piece 50 and shaft 24 overlap with each other in the axial direction, thereby preventing the extension portion 91 against deformation. Also, the protruding wall portion 92, together with the seat surface 88, is brought into contact with the bracket 26 by the bolt 12, thereby supporting the elastic piece 50 stably through the extension portion 91.

As shown in FIG. 8A, the projection 84 is situated on the tip end side from a base end 50a of the elastic piece 50 and is also situated on the tip end side from two slit ends 86 formed in the two ends of the elastic piece 50. As shown in FIG. 9, the projection 84 projects downward and comes into contact with or comes close to the bracket 26 located downward of the projection 84. When the elastic piece 50 flexes downward, the projection 84 comes into contact with the bracket 26.

Here, the elastic piece 50 extends from the extension portion 91 in the axial direction of the shaft 24 and, when it is flexed by rotation of the hook 22, a load is applied to the extension portion 91 from the base end 50a of the elastic piece 50. Without the projection 84, stress may concentrate around the slit ends 86. Thus, in order to disperse stress around the base end 50a of the elastic piece 50, particularly, around the slit ends 86, the projection 84 is formed in the elastic piece 50.

Figure 11:
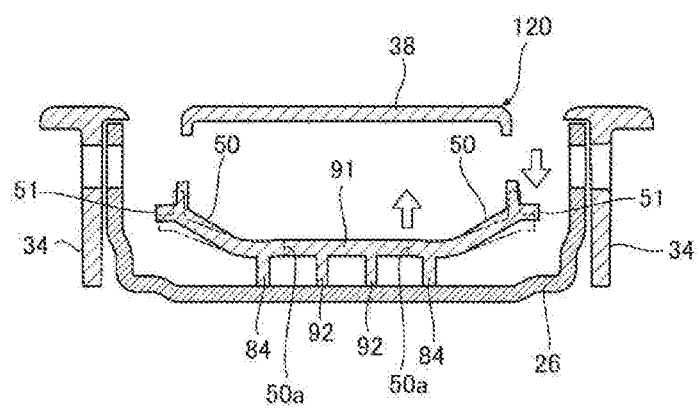
FIG. 11 is a view to explain the operation of a projection.

FIG. 11 is a view to explain the operation of the projection 84. FIG. 11 shows a section of the case 120 and bracket 26. When the hook 22 rotates, the radial-direction contact part 51 of the elastic piece 50 is pushed downward, thereby flexing the elastic piece 50. As the projection 84 situated in the intermediate portion of the elastic piece 50 comes into contact with the bracket 26, the projection 84 receives a load applied to the radial-direction contact part 51 and thus a load on the side of the base end 50a is reduced, whereby stress occurring around the base end 50a can be reduced. Also, since the protruding wall portion 92, together with the seat surface 88, is fixed to the bracket 26 by the bolt 12, even when it receives an upward load with the projection 84 as a fulcrum, the extension portion 91 can be prevented against deformation.

As described above, since stress concentration on the side of the base end 50a of the elastic piece 50 is dispersed when the elastic piece 50 flexes, even when the elastic piece 50 is molded integrally with the case 120, deterioration of the durability can be suppressed. Also, since the elastic piece 50 flexes with the projection 84 as a fulcrum, an energizing force to the hook 22 can be increased.

The projection 84 faces the protruding wall portion 92 across the base end 50a of the elastic piece 50. The protruding wall portion 92, together with the seat surface 88, is fastened by the bolt 12 and is thereby brought into contact with the bracket 26. Thus, since the base end 50a of the elastic piece 50 where stress is easy to occur is supported by the protruding wall portions 92 and projections 84 located on both sides of the elastic piece 50, stress concentration can be suppressed.

The projection 84 is located on the tip end side of the elastic piece 50 from the base end 50a and is located on the base end side 50a from the center of the elastic piece 50. Thus, while securing the flexibility of the elastic piece 50 to set properly the sense of operation of the hook 22, stress on the side of the base end 50a can be dispersed.

The invention is not limited to the above-mentioned respective embodiments but various modifications such as design changes can be applied to the respective embodiments, while embodiments with such modifications applied are also contained in the range of the invention.

In the embodiment, there is shown the example in which the first limit section 56 is formed in the cover part 38 and the second limit section 54 is formed in the bottom part 30. However, this is not limitative but, in order to receive a load from the hook 22, the first limit section 56 may be formed in the bottom part 30 and the second limit section 54 may be formed in the cover part 38.

In the embodiment, there is shown the example in which the elastic piece 50 extends from the bottom part 30 but this is not limitative. For example, the elastic piece may also extend from the side wall part 34 of the case 20 along the axial direction of the shaft 24.

BRIEF DESCRIPTION OF REFERENCE NUMERALS

10: Hook Apparatus, 12: Bolt, 14: Washer, 20: Case, 22: Hook, 24: Shaft, 26: Bracket, 30: Bottom Part, 30a: Support Portion, 30b: Lower Portion, 32: Flange Part, 34: Side Wall Part, 36: Shaft Hole Part, 38: Cover Part, 38a: Side Portion, 38c: Shaft Cover Portion, 38d: Bolt Cover Portion, 38b: Step Portion, 40: Hinge Part, 41: Recess, 42: Bolt Hole, 44: Locking Hole, 46: Locking Pawl, 48: Engaging Part, 50: Elastic Piece, 51: Radial-Direction Contact Part, 52: Axial-Direction Contact Part, 54: Second Limit Section, 56: First Limit Section, 58: Pin, 60: Hook Part, 62: Shaft Hole Part, 64: Protrusion Part, 66: Sliding Contact Part, 66a: First Outer Peripheral Surface, 66b: Second Outer Peripheral Surface, 66c: Third Outer Peripheral Surface, 67: Opposed Surface, 70: Plate Part, 72: Side Part, 74: Bearing Part, 76: Bolt Hole, 78: Stopper Part, 80: Engagement Part, 82: Slit

INDUSTRIAL APPLICABILITY

The invention relates to a hook apparatus for vehicles.
The invention claimed is:
1. A hook apparatus, comprising:
a case comprising a resin material;
a bracket comprising a metal material and configured to be fixed to a side of a vehicle body with the case mounted thereon;

a shaft supported by the bracket; and a hook including a pair of opposed surfaces facing each other and a pair of shaft hole parts formed in the pair of opposed surfaces and capable of inserting the shaft therethrough, the hook being supported rotatably on the bracket through the shaft, wherein the case includes an elastic piece extending along a rotation shaft direction of the hook and capable of coming into an elastic contact with the hook, and wherein the elastic piece includes:

radial-direction contact parts capable of coming into contact with sliding contact surfaces, respectively formed in the hook around the shaft hole parts, in a radially inward direction from outside in a radial direction; and axial-direction contact parts formed so as to protrude from intermediate portions of the elastic piece, to face the opposed surfaces of the hook formed around the shaft hole parts in an axial direction and to come into contact with the opposed surfaces of the hook.

2. The hook apparatus according to claim 1, wherein the elastic piece extends from a bottom part of the case, and wherein the bottom part of the case is capable of coming into contact with or coming close to the bracket in a position where the case overlaps with the elastic piece in the axial direction.

3. The hook apparatus according to claim 1, wherein the case further includes a cover part which, in a state where a mounting of the hook apparatus onto the vehicle body side is completed, faces a bottom part of the case for covering the shaft and the elastic piece between the paired shaft hole parts, wherein one of the bottom part and the cover part of the case includes a first limit section capable of coming into contact with or coming close to the opposed surfaces to limit an axially inward movement of the hood, and wherein an other of the bottom part and the cover part of the case includes a second limit section for limiting the axially inward movement of the first limit section.

4. The hook apparatus according to claim 1, wherein the elastic piece includes a projection provided on a side of a tip end of the elastic piece relative to a base end thereof and on a side of the base end of the elastic piece relative to the radial-direction contact parts thereof, and projected so as to come into contact with or come close to the bracket.

5. The hook apparatus according to claim 1, wherein a tip end of the elastic piece is bifurcated comprising bifurcated portions.

6. The hook apparatus according to claim 5, wherein one of the bifurcated portions constitutes the radial-direction contact parts.

7. The hook apparatus according to claim 6, wherein an other of the bifurcated portions constitutes the axial-direction contact parts.

8. The hook apparatus according to claim 1, wherein the sliding contact surfaces include bottom surfaces of the hook.

9. The hook apparatus according to claim 8, wherein the radial-direction contact parts contact with the bottom surfaces of the hook in the radial direction.

10. The hook apparatus according to claim 9, wherein the opposed surfaces of the hook include side surfaces of the hook that extend orthogonal to the bottom surfaces of the hook.

11. The hook apparatus according to claim 10, wherein the axial-direction contact parts contact with the side surfaces of the hook in the axial direction orthogonal to the radial direction.

12. The hook apparatus according to claim 1, wherein the case further includes a cover part which, in a state where a mounting of the hook apparatus onto the vehicle body side is completed, faces a bottom part of the case for covering the shaft and the elastic piece between the paired shaft hole parts.

13. The hook apparatus according to claim 12, wherein the bottom part of the case includes a first limit section capable of coming into contact with or coming close to the opposed surfaces to limit an axially inward movement of the hood.

14. The hook apparatus according to claim 13, wherein the cover part of the case includes a second limit section for limiting the axially inward movement of the first limit section.

15. The hook apparatus according to claim 12, wherein the cover part of the case includes a first limit section capable of coming into contact with or coming close to the opposed surfaces to limit an axially inward movement of the hood.

16. The hook apparatus according to claim 15, wherein the bottom part of the case includes a second limit section for limiting the axially inward movement of the first limit section.

17. A hook apparatus, comprising:

a case comprising a resin material;

a bracket comprising a metal material and configured to be fixed to a side of a vehicle body with the case mounted thereon;

a shaft supported by the bracket; and a hook including a pair of opposed surfaces facing each other and a pair of shaft hole parts formed in the pair of opposed surfaces and capable of inserting the shaft therethrough, the hook being supported rotatably on the bracket through the shaft, wherein the case includes an elastic piece extending from a bottom part of the case along a rotation shaft direction of the hook and capable of coming into an elastic contact with the hook, and wherein the elastic piece includes:

radial-direction contact parts capable of coming into contact with sliding contact surfaces formed in the hook around the shaft hole parts in a radially inward direction from outside in a radial direction; and a projection situated on a side of a tip end of the elastic piece relative to a part of a base end of the elastic piece, the part connected to the case, and on a side of the base end of the elastic piece relative to the radial-direction contact parts, the projection being projected so as to come into contact with or come close to the bracket.

18. The hook apparatus according to claim 17, wherein the bottom part includes:

a seat surface including a bolt hole and capable of being fastened to the vehicle body side through the bracket by a bolt;

a circumferential wall part standing up around the seat surface;

an extension part extending from an upper end side of the circumferential wall portion; and a protruding wall portion protruding from the circumferential wall portion and the extension portion to face the projection and capable of coming into contact with the bracket in a position where the case overlaps with the elastic piece in an axial direction, and wherein the elastic piece extends from the extension portion.

19. The hook apparatus according to claim 17, wherein the elastic piece further includes:

axial-direction contact parts formed so as to protrude from intermediate portions of the elastic piece, to face the opposed surfaces of the hook formed around the shaft hole parts in an axial direction and to come into contact with the opposed surfaces of the hook.

20. A hook apparatus, comprising:

a case comprising a resin material;

a bracket comprising a metal material and configured to be fixed to a side of a vehicle body with the case mounted thereon;

a shaft supported by the bracket; and a hook including a pair of opposed surfaces facing each other and a pair of shaft hole parts formed in the pair of opposed surfaces and capable of inserting the shaft therethrough, the hook being supported rotatably on the bracket through the shaft, wherein the case includes an elastic piece extending along a rotation shaft direction of the hook and capable of coming into an elastic contact with the hook, wherein the elastic piece includes:

radial-direction contact parts capable of coming into contact with sliding contact surfaces, respectively formed in the hook around the shaft hole parts, in a radially inward direction from outside in a radial direction; and axial-direction contact parts coming into contact with the opposed surfaces of the hook formed around the shaft hole parts, wherein the case further includes a cover part which, in a state where a mounting of the hook apparatus onto the vehicle body side is completed, faces a bottom part of the case for covering the shaft and the elastic piece between the paired shaft hole parts, wherein one of the bottom part and the cover part of the case includes a first limit section capable of coming into contact with or coming close to the opposed surfaces to limit an axially inward movement of the hood, and wherein an other of the bottom part and the cover part of the case includes a second limit section for limiting the axially inward movement of the first limit section.

* * * * *